June 6, 1972  C. L. SMITH ET AL  3,667,850
FLARE RADIOMETER
Filed Nov. 23, 1970
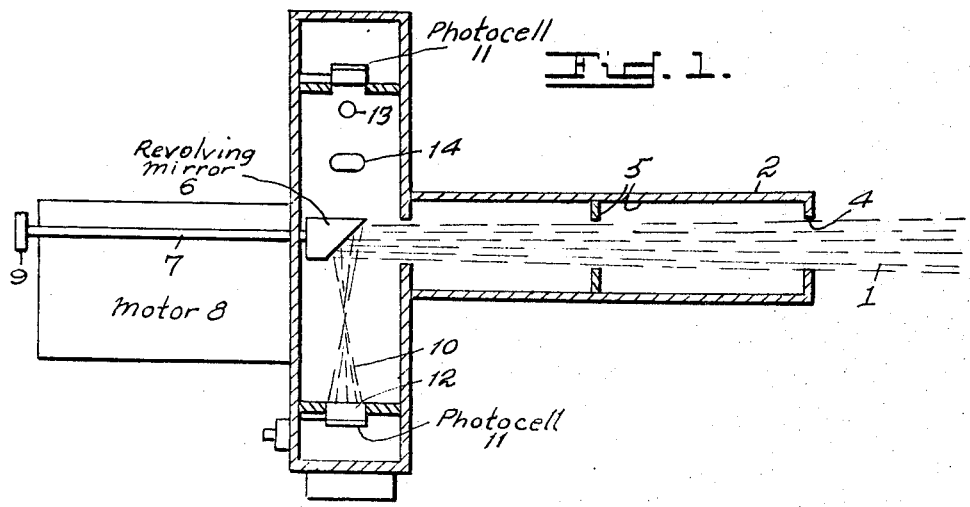
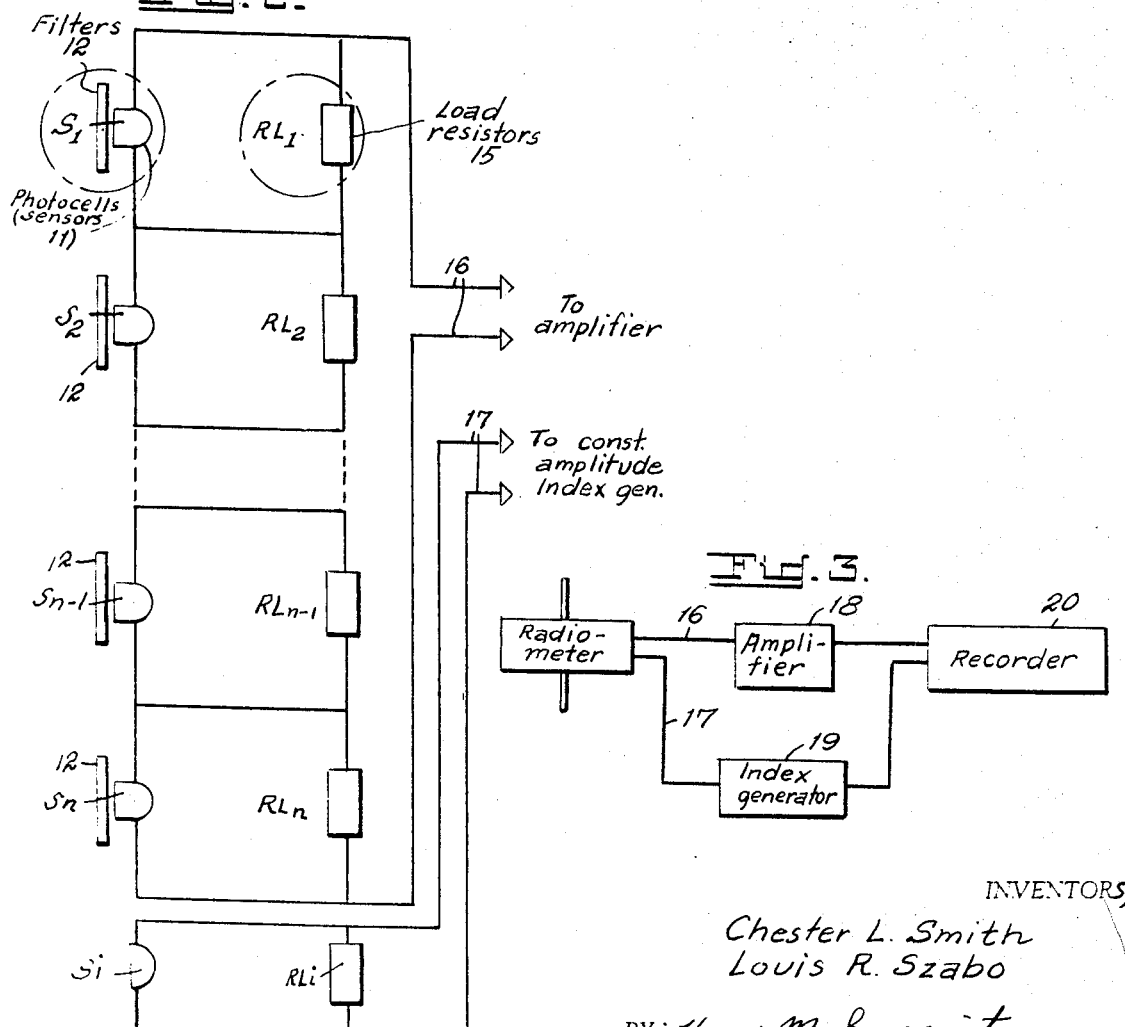
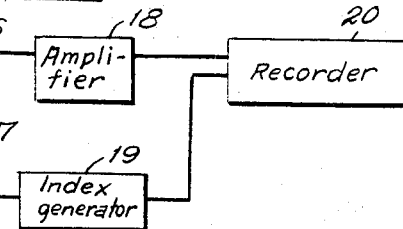
INVENTORS,
Chester L. Smith
Louis R. Szabo
BY: Harry M. Saragovitz,
Edward J. Kelly &
Herbert Berl
ATTORNEYS.

United States Patent Office 3,667,850
Patented June 6, 1972

3,667,850
FLARE RADIOMETER
Chester L. Smith, Lake Hopatcong, and Louis R. Szabo, Landing, N.J., assignors to the United States of America as represented by the Secretary of the Army
Filed Nov. 23, 1970, Ser. No. 91,896
Int. Cl. G01j 3/50
U.S. Cl. 356—186                                              5 Claims

ABSTRACT OF THE DISCLOSURE

A compact, inexpensive radiometer analyzes incoming light from a flare or other source and gives a rapid readout as to the output of the light source in all of the various bands and pass-bands of the spectrum.

---

The invention described herein may be manufactured, used and licensed by or for the Government for governmental purposes without the payment to me of any royalty thereon.

BRIEF DESCRIPTION

The flare designer, the manufacturer, the inspection evaluation engineer, and others need to analyze the output of flares as to total candlepower and as to output in the various segments, bands, or pass-bands of the visible spectrum. Previous systems for testing and inspection were expensive and sophisticated and required skilled operators for their use.

With the present invention testing is very fast and accurate. A skilled operator is not required, thereby saving on wages. And, the equipment is very simple and inexpensive to manufacture and maintain.

IN THE DRAWING

FIG. 1 is a cross sectional view through the radiometer.

FIG. 2 is a schematic diagram of the radiometer circuitry utilized.

FIG. 3 is a schematic diagram of the overall electrical system.

Light rays 1 enter housing 2 from source 3 through opening 4. Baffle system 5 avoids difficulties with stray or reflected rays. Mirror 6 is mounted obliquely to revolve about the axis of axle 7, driven by variable speed motor and gear reduction unit 8. Handwheel 9 permits setting of mirror 6 for adjustment to any desired position. Reflected rays 10 strike photocells 11 after passing through special interference filters 12. An index cell, with no filter, is illustrated at 13 with an aiming sight being illustrated at 14.

A series of photocells or sensors $S_1$, $S_2$ ... $S_{n-1}$, $S_n$ and $S_i$ are placed behind filter 12. Matched with these photocell sensors are load resistors 15 designated $RL_1$, $RL_2$ ... $RL_{n-1}$, $RL_n$, and $RL_i$ respectively. The outputs from the sensors are conducted through lines 16 and 17 to amplifier 18 and index generator 19 and thence to recorder 20, preferably a multiple channel visible recording device such as is known by the trade name "Visicorder."

OPERATION

A flare or other light-emitting source 3 to be tested is secured at a precise location in front of housing 2. Rays 1 are reflected from mirror 6 toward the outer periphery of the housing where they are filtered by special selective interference filters 12. The filtered rays strike photocells 11 in sequence as mirror 6 is revolved.

The special filters are more fully described as follows. The bands of the visible spectrum are red, orange, yellow, green, blue and violet. These are further divided into pass-bands. There are 200, plus or minus 20, angstrom units in each pass-band. In the red band there are four pass-bands, each being 200, plus or minus 20, angstrom units in width. Therefore, four special interference filters are used, together with four photocells, to pick up the light in the red band as passed by the red pass-band filters. Similarly there is one pass-band in the orange band, one in the yellow band, three in the green band, three in the blue band and one in the violet band. Therefore there will be a corresponding number of special pass-band filters and pickup photocells for the respective color bands and pass-bands. In operation, each interference filter acts to separate light of a particular wavelength or color from the rest of the light beam by passing only a narrow wavelength band of the light which then activates the photocell behind such filter. The photocell converts the light energy from that particular color filter to electric current and the amount of the current converted by such photocell indicates the amount of colored light of the selected wavelength passed through the filter. The current signals are converted to voltage signals across the load resistors and then amplified and recorded. In this manner the amount of each color or wavelength of light preselected by the type of interference filter used with each photocell is recorded, and the color content of the light being tested is readily determined.

Although we describe filter-sensor units, for each of the pass-bands, the invention is intended to cover situations where only the primary band colors are to be investigated. For such use a smaller number of units could be used, e.g. one unit for the entire red band instead of four units for the red pass-bands.

Referring again to FIGS. 2 and 3, index photocell or sensor $S_i$ has no filter ahead of it and receives light at full intensity from mirror 6 with each revolution. It sends a reference index output signal via line 17 to a constant amplitude index generator 19 which feeds a corresponding signal to recorder 20. This indicates the total intensity of light source 3 and also serves as a basis for comparison with the other signals generated by the other photocells or sensors $S_1$ to $S_n$. However, a filter could be inserted in front of sensor $S_i$ to block out or attenuate any bands of the spectrum which may be undesired.

Although the invention has been described in detail with reference to testing in the visible spectrum it will be obvious to those skilled in the art that the principles involved are applicable to testing in the infra-red and ultraviolet regions.

It will be evident from the foregoing that the operator need only place a source of light 3 in front of the radiometer and start motor 8. Beam 10 will scan sensor $S_i$ to $S_i$ and the recorder will record the overall light intensity through sensor $S_i$ plus the intensity in each band and each pass-band through sensors $S_1$ through $S_n$.

We claim:

1. Radiometer apparatus comprising a housing having an inlet for light and an enlarged peripheral area, an obliquely mounted mirror disposed in the path of the light from the housing inlet to reflect the light toward the peripheral area of the housing, means to rotate the mirror to reflect the light in a scanning pattern around the peripheral area, a plurality of photocells disposed in spaced relation about the peripheral area in the path of the light reflected from the rotating mirror to convert light reflected from the mirror into electric current signals, interference filters disposed between the miror and some of the photocells, each of said filters being designed to intercept light reflected from the mirror and pass a particular narrow band of wavelength of such light to the photocell behind it, said band of wavelength of light passed by each filter being different from that band of wavelength of light passed by each of the other filters, and means to record the electric signals from each photocell to determine the amount of the band of wavelength of light passed by each interference filter to thereby indicate the color content of the light entering the housing inlet and reflected by the rotating mirror.

2. The apparatus as in claim 1 wherein one of said photocells is without a filter to receive the full spectrum and full intensity of the reflected light.

3. The apparatus as in claim 2 wherein said filters and photocells include a filter-photocell unit for each of the primary bands or colors of the spectrum.

4. The apparatus as in claim 3 wherein said filters and photocells include a filter-photocell unit for each of the pass-bands of the spectrum.

5. The apparatus as in claim 1 and means in said light inlet to eliminate stray or reflected rays.

References Cited
UNITED STATES PATENTS 3,122,052  2/1964  Buck _____ 350—7 X
3,475,552  10/1969  Makino et al. _____ 350—285 X RONALD L. WIBERT, Primary Examiner F. L. EVANS, Assistant Examiner U.S. Cl. X.R.

250—83.3 H, 220, 236; 350—7, 285; 356—51, 216